US006452615B1

United States Patent
Chiu et al.

(10) Patent No.: US 6,452,615 B1
(45) Date of Patent: Sep. 17, 2002

(54) SYSTEM AND APPARATUS FOR NOTETAKING WITH DIGITAL VIDEO AND INK

(75) Inventors: Patrick Chiu, Menlo Park; Lynn Wilcox, Portola Valley; Ashutosh Kapuskar, Sunnyvale, all of CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/275,285

(22) Filed: Mar. 24, 1999

(51) Int. Cl.[7] ................................................. G06F 3/00
(52) U.S. Cl. ...................... 345/776; 345/716; 345/719; 345/764; 345/730; 707/541; 707/512
(58) Field of Search ................................. 345/863, 719, 345/723, 716, 717, 730, 731, 776; 382/186, 187, 189; 707/501, 512, 541

(56) References Cited

U.S. PATENT DOCUMENTS

| | | | | |
|---|---|---|---|---|
| 5,717,869 A | * | 2/1998 | Moran et al. | 345/764 |
| 5,786,814 A | * | 7/1998 | Moran et al. | 345/723 |
| 5,986,655 A | * | 11/1999 | Chiu et al. | 345/839 |
| 6,128,649 A | * | 10/2000 | Smith et al. | 709/217 |
| 6,279,014 B1 | * | 8/2001 | Schilit et al. | 707/512 |

OTHER PUBLICATIONS

Abowd, G.D., Atkeson, C.G., Brotherton, J., Enqvist, T., Gulley, P., and LeMon, J. Investigating the capture, integration and access problem of ubiquitous computing in an educational setting. *Proceedings of the CHI '98 Conference.* ACM, New York, pp. 440–447.

Abowd, G.D., Atkeson, C.G., Feinstein, A., Hmelo, C., Kooper, R., Long, S., Sawhney, No., and Tani, M. Teaching and learning as multimedia authoring: the classroom 2000 project. *Proceedings of the ACM Multimedia '96 Conference.* ACM, New York, pp. 187–198.

Cruz, G. and Hill, R. Capturing and playing multimedia events with STREAMS. *Proceedings of the ACM Multimedia '94 Conference.* ACM, New York, pp. 193–200.

Harrison, B. and Baecker, R.M. Designing video annotation and analysis systems. *Graphics Interface '92.* Morgan–Kaufmann, pp. 157–166.

Isaacs, E.A., Morris, T., and Rodriguez, T.K. A forum for supporting interactive presentations to distributed audiences. *Proceedings of CSCW '94.* ACM, New York, pp. 405–416.

Lamming, M., and Newman, W. Activity–based information technology in support of personal memory. Technical Report EPC–1991–103. Rank Xerox, EuroPARC, 1991.

(List continued on next page.)

*Primary Examiner*—Raymond J. Bayerl
*Assistant Examiner*—Cuong T. Thai
(74) *Attorney, Agent, or Firm*—Fliesler Dubb Meyer & Lovejoy LLP

(57) ABSTRACT

Media input streams are retrieved by a notetaking device and referenced for playback. The media streams are from microphones, video cameras, and media players present during a notetaking session. Facilities provided by the notetaking device allow a user to capture stills from the media streams, make annotations, and reference important events that occur during a notetaking session. Thumbnails, snaps, and backgrounds may be created from the input media streams and are used to reference into the media streams which are stored for later playback. A channel changer allows a user to switch between the various media streams during either notetaking or playback. A timeline is automatically generated that references important events, including slide changes, presented during a notetaking session.

25 Claims, 7 Drawing Sheets

OTHER PUBLICATIONS

MacKay, W.E. EVA: An experimental video annotator for symbolic analysis of video data. *SIGCHI Bulletin,* 21 (2), 68–71. 1989, ACM Press.

Minneman, S., Harrison, S., Janssen, B., Kurtenbach, G., Moran, T., Smith, l., and van Melle, B. A confederation tools for capturing accessing collaborative activity. *Proceedings of the ACM Multimedia '95 Conference.* ACM, New York, pp. 523–534.

Moran, T.P., Palen, L, Harrison, S., Chiu, P., Kimber, D., Minneman, S., van Melle, W., and Zellweger, P. "I'll get that off the audio": a case study of salvaging multimedia meeting records. *Proceedings of CHI '97.* ACM, New York, pp. 202–209.

Stifelman, L. *Augmenting Real–World Objects: A Paper–Based Audio Notebook,* CHI '96, pp. 199–200.

Trigg, R. Computer support for transcribing recorded activity, *SIGCHI Bulletin,* 21 (2), 68–71, 1989, ACM Press.

Weber, K., and Poon, A. Marquee: a tool for real–time video logging. *Proceedings of CHI '94.* ACM, New York, pp. 58–64.

Whittaker, S., Hyland, P., and Wiley, M. Filochat: handwritten notes provide access to recorded conversations. *Proceedings of CHI '94.* ACM, New York, pp. 271–276.

Wilcox, L.D., Schilit, B.N.,and Sawhney, N. Dynomite: A Dynamically Organized Ink and Audio Notebook. *Proceedings of CHI '97.* ACM, New York, pp. 186–193.

Brown, B., Sharp Zaurus ZR–5800FX, *Computer Shopper,* Jun. 1997, www.zdnet.com products content cshp 1706 cshp0193.html.

Zaurus K–PDA PC Companion, Sharp Zaurus K–PDA PC Companion ZR–3000 Product Information, www.pygmy.com/reseller/zr3000.htm.

\* cited by examiner

Architecture for NoteLook in Kumo

SYSTEM AND APPARATUS FOR NOTETAKING WITH DIGITAL VIDEO AND INK

BACKGROUND OF THE INVENTION

1. Field of the Invention

This invention relates to an integrated multimedia notetaking system. The invention is more particularly related to a notetaking system that utilizes digital video and ink as references and notes. The invention is further related to a notetaking system utilizing video feeds for provision of illustrative notes, book marking, and indexing material. The invention is still further related to the indexing of at least one of notes and a video feed via the use of thumbnails, timestamps, and background snaps. The invention is yet further related to a notetaking system having a slide detection process for automatic notetaking, and as a feed mechanism for frame rate compression for optimizing bandwidth when presenting material to the notetaking system.

2. Discussion of the Background

Multimedia notetaking systems typically capture audio and video during a meeting and slides are created from the captured material (For example, Tivoli, a system running on LiveBoard, see Moran, T. P., Palen, L., Harrison, S., Chiu, P., Kimber, D., Minneman, S., van Melle, W., and Zellweger, P. "I'll get that off the audio": a case study of salvaging multimedia meeting records. *Proceedings of CHI '97 CM*, New York, pp. 202–209). Tivoli is designed to support working meetings rather than presentation meetings. The ink strokes in Tivoli, which are indexed to the audio, along with any prepared material on the Tivoli slides become the group notes to the meeting. A participant using a laptop may "beam" typed text comments onto a slide in Tivoli.

In a similar example, Classroom 2000, images of presentation slides and audio are captured, but video is not used (see Abowd, G. D., Atkeson, C. G., Brotherton, J., Enqvist, T., Gulley, P., and LeMon, J. Investigating the capture, integration and access problem of ubiquitous computing in an educational setting. *Proceedings of the CHI '98 Conference*. ACM, New York, pp. 440–447; and Abowd, G. D., Atkeson, C. G., Feinstein, A., Hmelo, C., Kooper, R., Long, S., Sawhney, N., and Tani, M. Teaching and learning as multimedia authoring the classroom 2000 project. *Proceedings of the ACM Multimedia '96 Conference*. ACM, New York, pp. 187–198). In addition, Classroom 2000 requires effort by the presenter to prepare the slides in a standard graphics format. The slides are displayed on a LiveBoard and note-taking is done with PDA devices pre-loaded with slides These notes are later synchronized to the audio and the slides which have been annotated by the professor lecturing in front of the LiveBoard.

In yet another example, the Forum (see Isaacs, E. A., Morris, T., and Rodriguez, T. K. A forum for supporting interactive presentations to distributed audiences. *Proceedings of CSCW '94*. ACM, New York, pp. 405–416), is a system uses video as a means for distributed presentations. Everyone, including the speaker, sits in front of a workstation during a presentation. Slides have to be prepared in a specified format. The slides can be annotated with text and marks drawn with a mouse, but the video images cannot be annotated.

In another example, the STREAMS (see Cruz, G., and Hill, R. Capturing and playing multimedia events with STREAMS. *Proceedings of the ACM Multimedia '194 Conference*. ACM, New York, pp. 193–200), is a system for presentation capture that uses video from room cameras. These cameras are also used to capture any presentation content on display. This method has problems when activity in the room obscures the display. Note-taking during the presentation is not supported, although the captured video streams can be annotated during review by adding text comments. None of these systems allow interactive integration of live images from cameras and presentation material into the notes.

In addition, there are also several known stand alone ink and audio note-taking systems. For example, FXPAL Dynomite (see Wilcox, L. D., Schilit, B. N., and Sawhney, N. Dynomite: A Dynamically Organized Ink and Audio Notebook. *Proceedings of CHI '97*. ACM, New York, pp. 186–193); and Audio Notebook (see Stifelman, L. *The Audio Notebook: Paper and Pen Interaction with Structured Speech*. PhD Thesis. MIT, 1997), which uses paper with audio recording. Filochat (see Whittaker, S., Hyland, P., and Wiley, M. Filochat: handwritten notes provide access to recorded conversations. *Proceedings of CHI '94*. ACM, New York, pp. 271–276), is a PC computer with a pen tablet in which audio is indexed with handwritten notes; and NoTime (see Lamming, M., and Newman, W. Activity-based information technology in support of personal memory. Technical Report EPC-1991-103, Rank Xerox, EuroPARC, 1991), was designed to key the user's ink strokes to recorded audio or video.

Also known are video annotation systems. Marquee (see Weber, K., and Poon, A. Marquee: a tool for realtime video logging. *Proceedings of CHI '94*. ACM, New York, pp. 58–64) is a pen-based system for making annotations while watching a videotape. A later version of Marquee has modifications to take timestamps on digital video streams from the WhereWereWe multimedia system (see Minneman, S., Harrison, S., Janssen, B., Kurtenbach, G., Moran, T., Smith, I., and van Melle, B. A confederation of tools for capturing and accessing collaborative activity. *Proceedings of the ACM Multimedia '95 Conference*. ACM, New York, pp. 523–534).

Vanna (see Harrison, B., Baecker, R. M. Designing video annotation and analysis systems, *Graphics Interface '92*. Morgan-Kaufmann, pp. 157–166); and EVA (see MacKay, W. E. EVA: An experimental video annotator for symbolic analysis of video data, *SIGCHIBulletin*, 21 (2), 68–71. 1989. ACM Press) are text based systems. VideoNoter (Trigg, R. Computer support for transcribing recorded activity, *SIGCHI Bulletin*, 21 (2), 68–71. 1989. ACM Press) displays and synchronizes different streams of activity (video, figures whiteboard drawings, text), but requires post-production to transcribe text from the audio or extract drawings from a whiteboard. These systems are limited by their design based on using videotapes rather than digital video. None of these systems allow interactive integration of video images into the notes. Sharp Zaurus (*Zaurus Operation Manual*. Sharp Corporation, 1996) is a commercial product, which is a PDA with a digital camera attached. Digital photos can be taken and linked to handwritten notes.

SUMMARY OF THE INVENTION

The present inventors have realized that note-taking is a common activity that can be made more powerful with video. The present inventors have also realized the need to provide a fully integrated digital video and ink notetaking system.

Accordingly, it is an object of the present invention to provide a multimedia notetaking system.

It is another object of the present invention to provide a notetaking system that allows the user to annotate images captured from a media stream input to the notetaking system.

It is yet another object of the present invention to provide a notetaking system having a timeline that identifies significant events occurring during a notetaking session.

It is yet another object of the present invention to provide a notetaking system that captures live multimedia steams and utilizing framerate compression to provide the multimedia streams to a notetaking device and to automatically summarize events such as slide changes into a timeline.

And it is still further yet another object of the present invention to allow a user to bookmark points in a captured multimedia stream in a notetaking device.

These and other objects are accomplished by a system for note-taking with digital video and ink (also referred to as NoteLook). The invention includes a notetaking device that includes, a media input mechanism configured to retrieve at least one media stream, at least one user input mechanism configured to accept user inputs, and a control device configured to allow the user to at least one of manipulate, connote, and summarize the at least one media stream via the user inputs.

In one embodiment, NoteLook includes a client application that runs on a pen-based notebook computer. NoteLook has a display with a main area resembling a paper notebook page for writing, capturing, and annotating images. There is a small video window for viewing the active video. The user may change channels to view different video streams. The user can grab a frame that is showing in the video window as a small thumbnail in the margin of a note page or as a large background.

The thumbnails, background images, and ink strokes are time stamped and provide indexes into the video. The video source is handled by a NoteLook server, which runs on a computer that has the video input. The NoteLook server also transmits the video, audio, as well as meta data (times of slide changes, or speaker changes, for example) to the NoteLook client application, typically via a wireless or wired network. These streams of multimedia data are archived by the NoteLook server and can be randomly accessed by the clients during playback. Multiple instances of NoteLook clients and servers can operate together. The video source can be captured in a variety of ways: from a room camera or document camera, from a tap into a rear projector, TV, VCR or any video stream, or from a small portable camera attached to a pen computer.

In meetings, presentations and classes, the NoteLook digital video and ink note-taking system can be used to snap still images of the speaker, room activity, and presentation material and integrate them into the notes. The snapped images and ink strokes can be timestamped and linked to the recorded video for easy browsing and retrieval. Video can capture gestures, nonverbal activity, and show context. Video provides a versatile means of capturing the presentation content in a variety of forms. PowerPoint slides, Web pages, overhead slides, whiteboard, and more dynamic media such as animation and video can all be captured with video.

Demonstrations during presentations and training sessions are also effectively captured by video. In order for a digital ink and video note-taking system to be usable, it must be unobtrusive for the note-takers and other participants in the room and require minimal preparation from the speaker.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
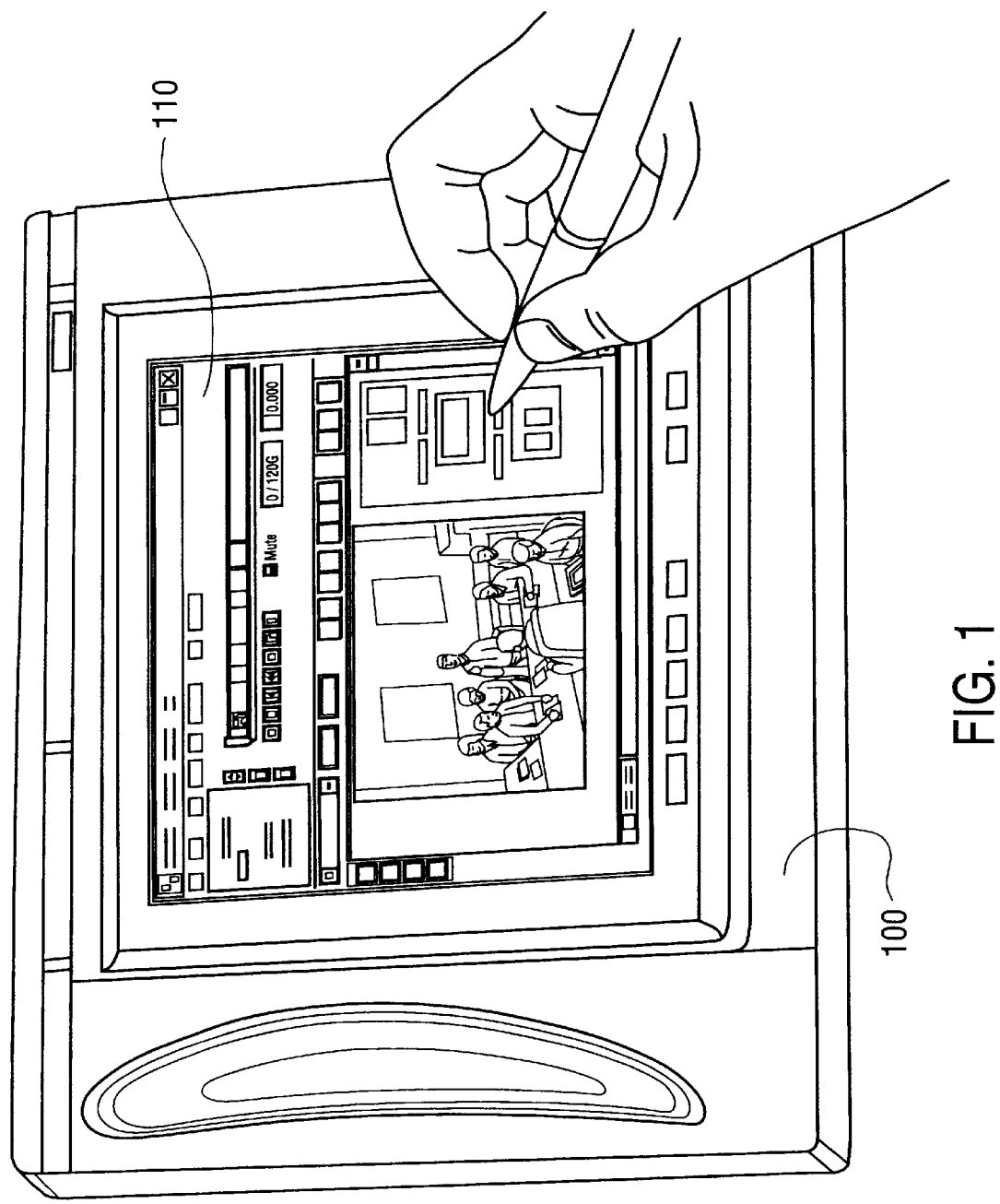
FIG. 1 is a picture of a NoteLook client running on a pen based computer.

Referring now to the drawings, wherein like reference numerals designate identical or corresponding parts, and more particularly to FIG. 1 thereof, there is illustrated a pen based computer 100 running a NoteLook client application 110.

Although applicable to other platforms, a pen-based notebook computer, especially when used with a wireless network, has a form factor that is unobtrusive for note-takers and other participants in the room.

In a current embodiment, the NoteLook client is built on top of the FXPAL Dynomite ink and audio note-taking application. It has a main area resembling a paper notebook page for writing, capturing and annotating images. There is a small video window for viewing the active video The user may change channels to view different video streams, grab a frame that is showing in the video window as a small thumbnail in the margin of a note page, or grab a frame as a large background image. The thumbnails, background images, and ink strokes are timestamped and provide indexes into the video.

The video source is handled by the NoteLook Server, which runs on a computer that has the video input. The NoteLook Server also transmits the video, audio, as well as meta data to the NoteLook client application via a wireless (or wired) network. Multiple instances of NoteLook Servers and clients can operate together, even on the same machine. In one embodiment a server is configured for each video channel, for example, three video channels would be handled by three separate servers, which would service any number of notebook clients. The video source can be captured in a variety of ways: from a room camera or document camera, from a tap into a rear projector, TV, VCR or any video stream, or from a small portable camera attached to a pen computer.

The present inventors have also realized that skewing is a problem with employing an externally mounted camera to capture presentation content, and, in at least one embodiment, have provided full digital capture for graphics and other presentation material.

Figure 2A:
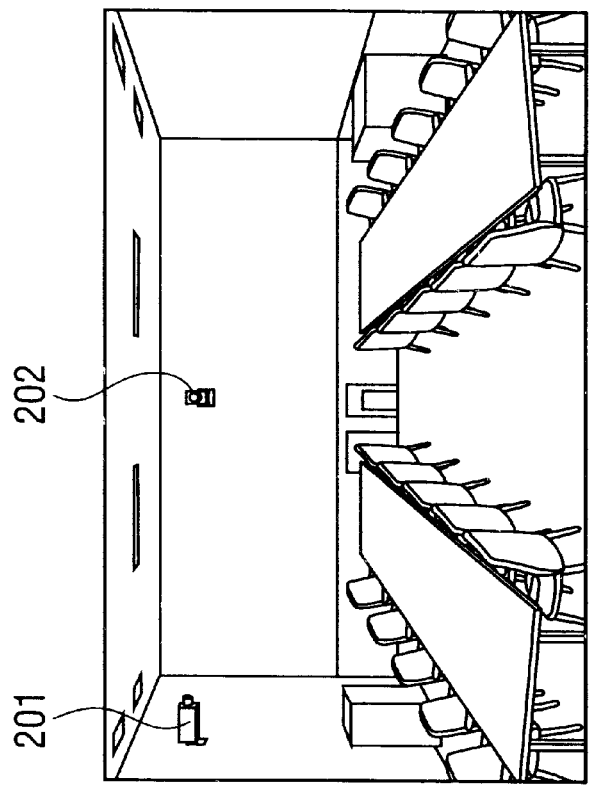
FIG. 2A is a forward looking view of an FXPAL conference room.
Figure 2B:
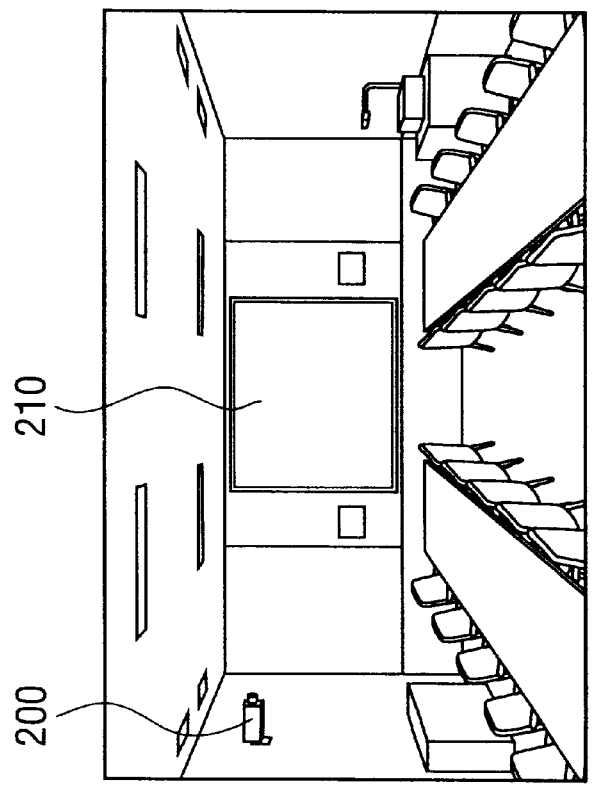
FIG. 2B is a reverse view of the FXPAL conference room.

The NoteLook server has been implemented and integrated with the Kumo conference room at FXPAL, see FIGS. 2A and 2B. In one embodiment, there are three room cameras (200, 201, and 202), each providing a channel of video (additional cameras with alternate or remote views may also be supported). The rear projector 210 provides another channel for the presentation content, which comes from a computer, document camera, and VCR/DVD (not shown). This set up requires minimal preparation from the speaker. The speaker can plug in her own laptop with PowerPoint slides or Web pages, feed overhead slides to the document camera, or play videotapes in the VCR. None of this requires much more extra preparation beyond normal work practice.

An advanced feature of the NoteLook system is automatic note-taking using slide change detection. The video from the rear projector containing the presentation material is analyzed to determine when slide changes occur. Individual slides are extracted and a set of note pages containing these slide images are produced. For indexing video, the points in time when slide changes occur are displayed by marks on the timeline to give visual information that facilitates browsing.

A further application of slide change detection is frame rate compression for optimizing bandwidth over the wireless network. The digital video is captured at 15 or 30 frames a second by the NoteLook server and stored for playback. Since slides do not change anywhere near that rate, a presenter might change a slide every minute or two, it makes sense for the NoteLook server to transmit a video frame only when there is a slide change.

We describe two variations of the system: NoteLook 2GO and NoteLook 4TV. NoteLook 2GO is a completely portable ink and video note-taking system. It takes the basic NoteLook client running on a pen-based notebook computer and adds a small video camera. This can be used for doing trip reports or field studies. NoteLook 4TV is the basic NoteLook client configured with video input from a TV or VCR. This can be used for distance learning and analysis of videotapes or broadcast video. As will be appreciated by those of ordinary skill in the art, each of the above embodiments are clearly applicable to other situations, for example, either may be utilized effectively in a classroom setting.

Technical Details

The NoteLook client is an ink and audio note-taking application that has video window and video handling capabilities. Current development work has been performed on Windows 95/NT, although the features and capabilities described herein are applicable and may be developed on any operating system of ordinary capability.

Figure 3:
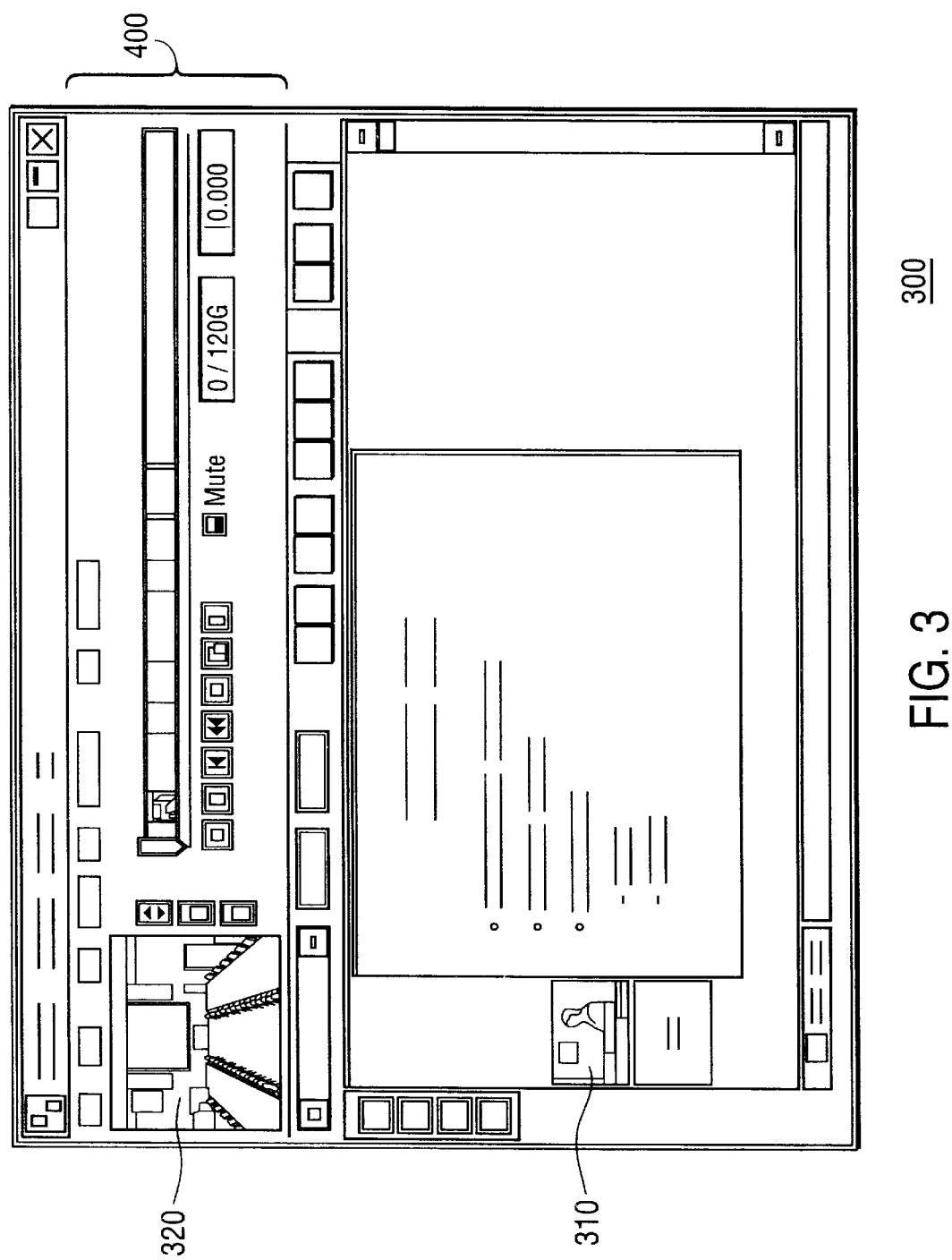
FIG. 3 is a screen shot of the NoteLook client application.
Figure 4:
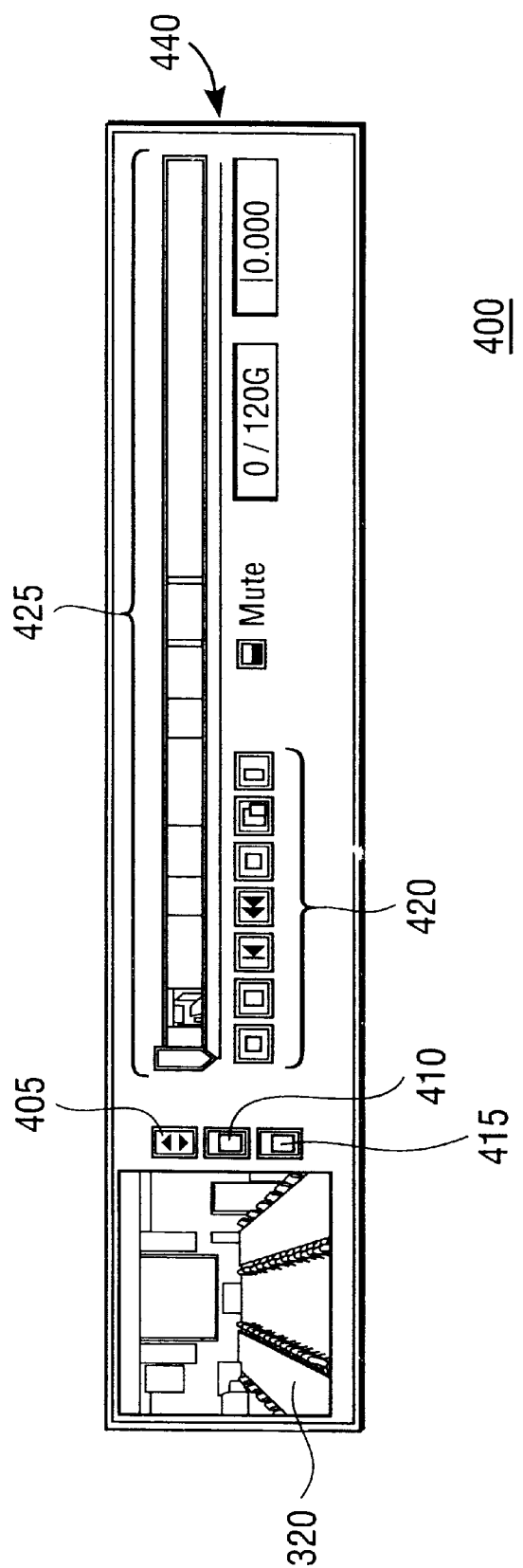
FIG. 4 is a closeup of video controls and timeline display indexes of the NoteLook client.

A screenshot 300 of NoteLook is shown in FIG. 3, including a close-up of the video window and video controls 400 is shown in FIG. 4. Next to the video window are three buttons for interacting with the video: the top button (channel changer button 405) changes channels, the middle button 410 snaps a thumbnail into the margin of the note page, and the bottom button 415 snaps in a large background image (i.e., an image available for annotation or perhaps enlarged for viewing).

Further to the left of the video window is a set of VCR type controls 420. A timeline 425 has a pointer for indicating the current time position of the video. The timeline can also display indexing information to facilitate browsing and reviewing.

FIG. 4 also shows a close-up of the timeline generated from the session shown in FIG. 3. When the user snaps in either a thumbnail (310, for example) or a background, a tiny version of that image is placed in the timeline. In addition, when the user writes with the pen, a band with same color as the pen color is placed in timeline.

Automatically computed meta data is also displayed; for example, a dotted line 440 in FIG. 4 indicates that a slide change has been detected at that point. A video window 320 on the top left corner allows the user to view the active video.

Figures 5, 7:
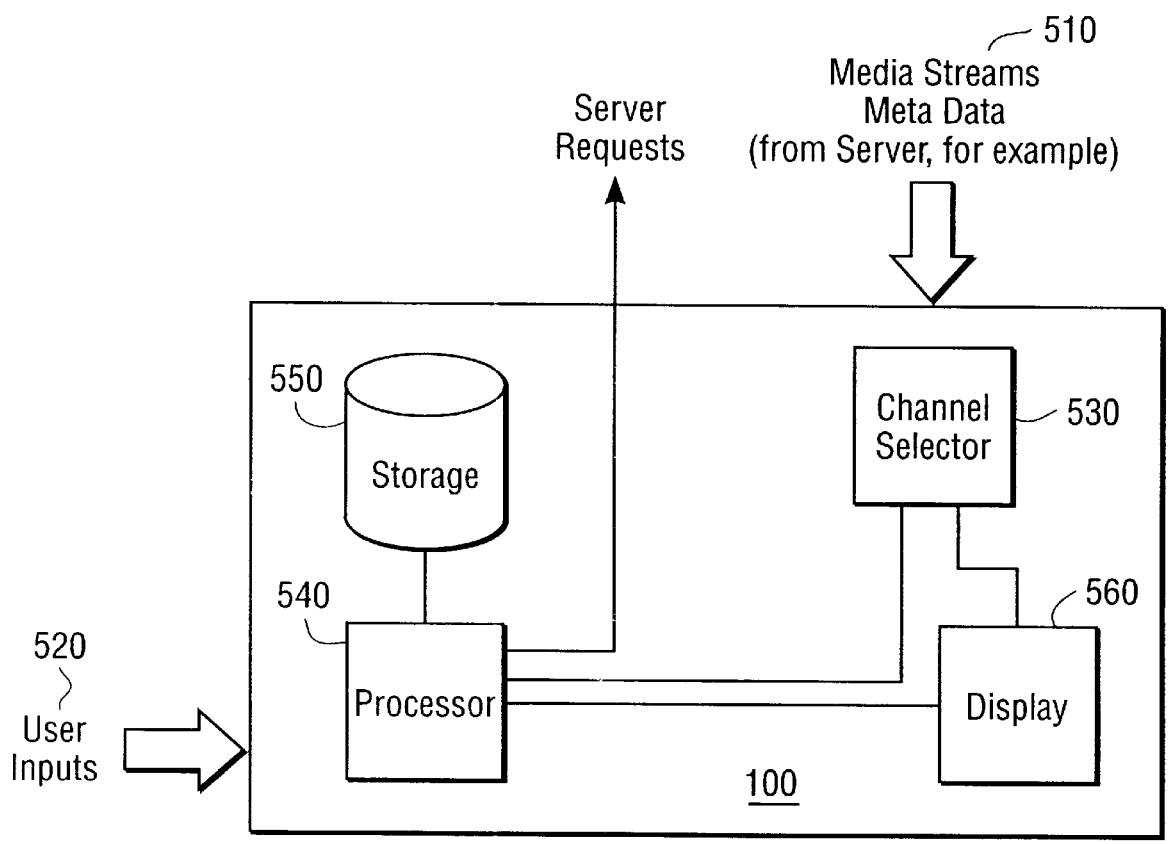
FIG. 5 is a block diagram illustrating one possible embodiment of a notetaking device according to the present invention.
FIG. 7 is an example of one possible embodiment of a note file produced by the notetaking system according to the present invention.

FIG. 5 illustrates a block diagram of one possible implementation of a device for operating the NoteLook client 110. Media stream(s) and Meta Data 510 are received from the NoteLook server. A storage device 550 maintains storage of the NoteLook program and any note files or other data created or saved during a NoteLook session.

A channel selector 530 directs an appropriate stream to display 560 (for display in video window 320). A processor 540 receives user inputs (such as channel selection) and directs channel selection, and output (button placement, etc) to the display 560. The processor 540 may also initiate user requests sent to the server (recall or playback of a video at a specific timestamp or snapshot, for example).

Figure 6:
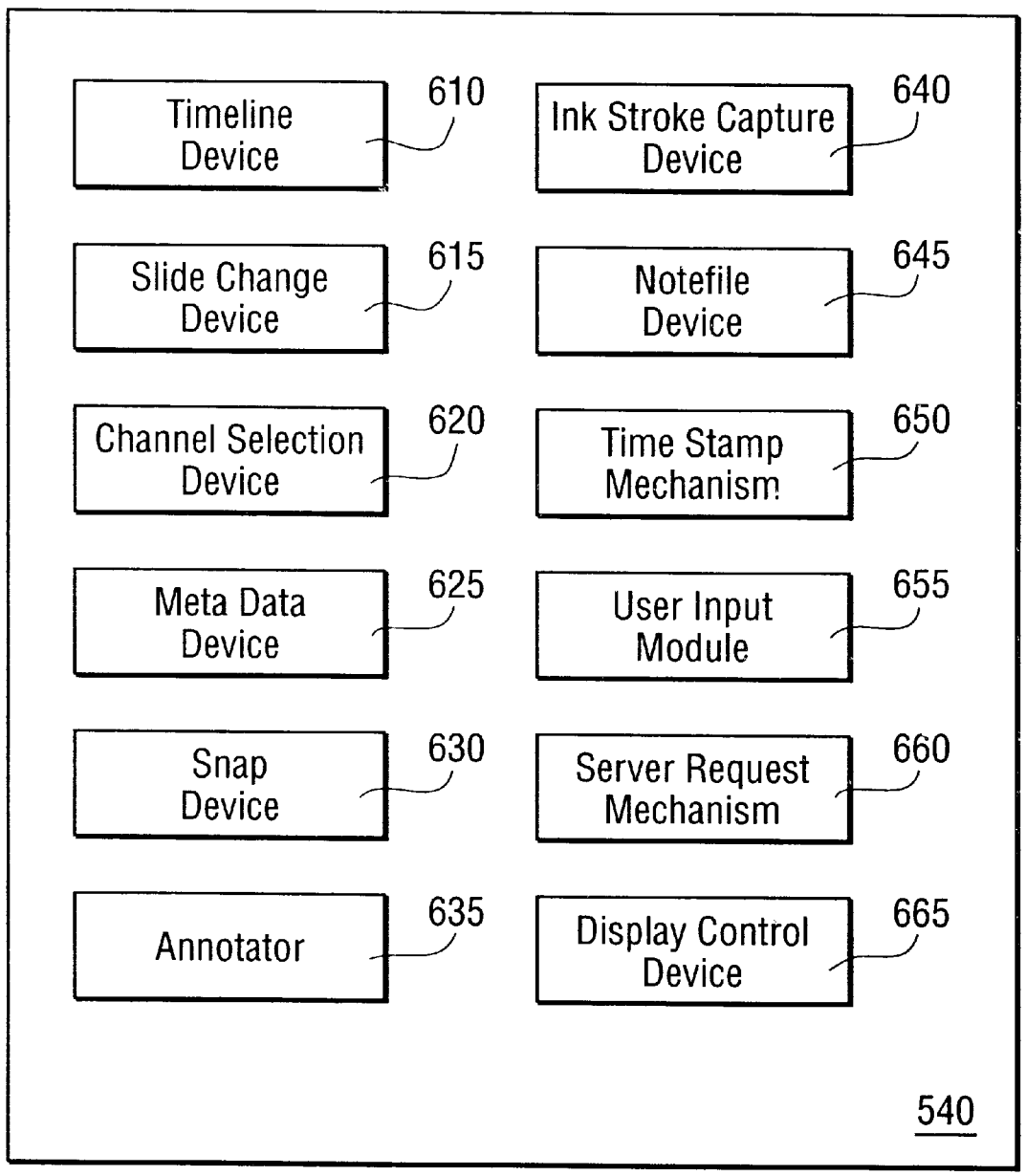
FIG. 6 is a block diagram illustrating components of a processor for the notetaking device according to the present invention.

When loaded with the NoteLook program, the processor 540 performs the operations described above. The processor itself may be illustrated, but not limited to, specific devices as those shown in the block diagram of FIG. 6.

During a note-taking session, each instance of a NoteLook client produces a note file consisting of digital ink strokes, thumbnails, and background snaps. These objects are timestamped and attributed with a channel number, which provides indexes into the video streams.

FIG. 7 illustrates one possible implementation of a note file according to the present invention. The note file references any one of the objects or items 700 input by the NoteLook 100 (thumbnail 710, ink strokes 715, and snap 720, for example). Each object has a corresponding timestamp 750 and channel identifier 770. Individual note files and additional information may also be maintained.

After the session, a user can review the notes and play the video corresponding to an object by selecting it and pressing the PLAY button. Clicking or double clicking on the thumbnails is another way to play the video. Playing an object will start the video at the (time, channel) corresponding to (time, channel) when the object was created (alternatively the thumbnails may point or link to specific video or media segment).

The user may change channels during playback by pressing the channel changer button (405). The timeline, which visually maps out the note-taking activity by time, provides yet another way to browse and play the video at points of interest. To play, the user simply drags the pointer on the timeline to the desired place or clicks at a location on the timeline.

The digital video streams are saved separately by the server onto the network, and can be randomly accessed via note files taken by different individuals. Alternatively, the video can be saved locally with the note files, but this requires a large amount of file space.

Figure 8:
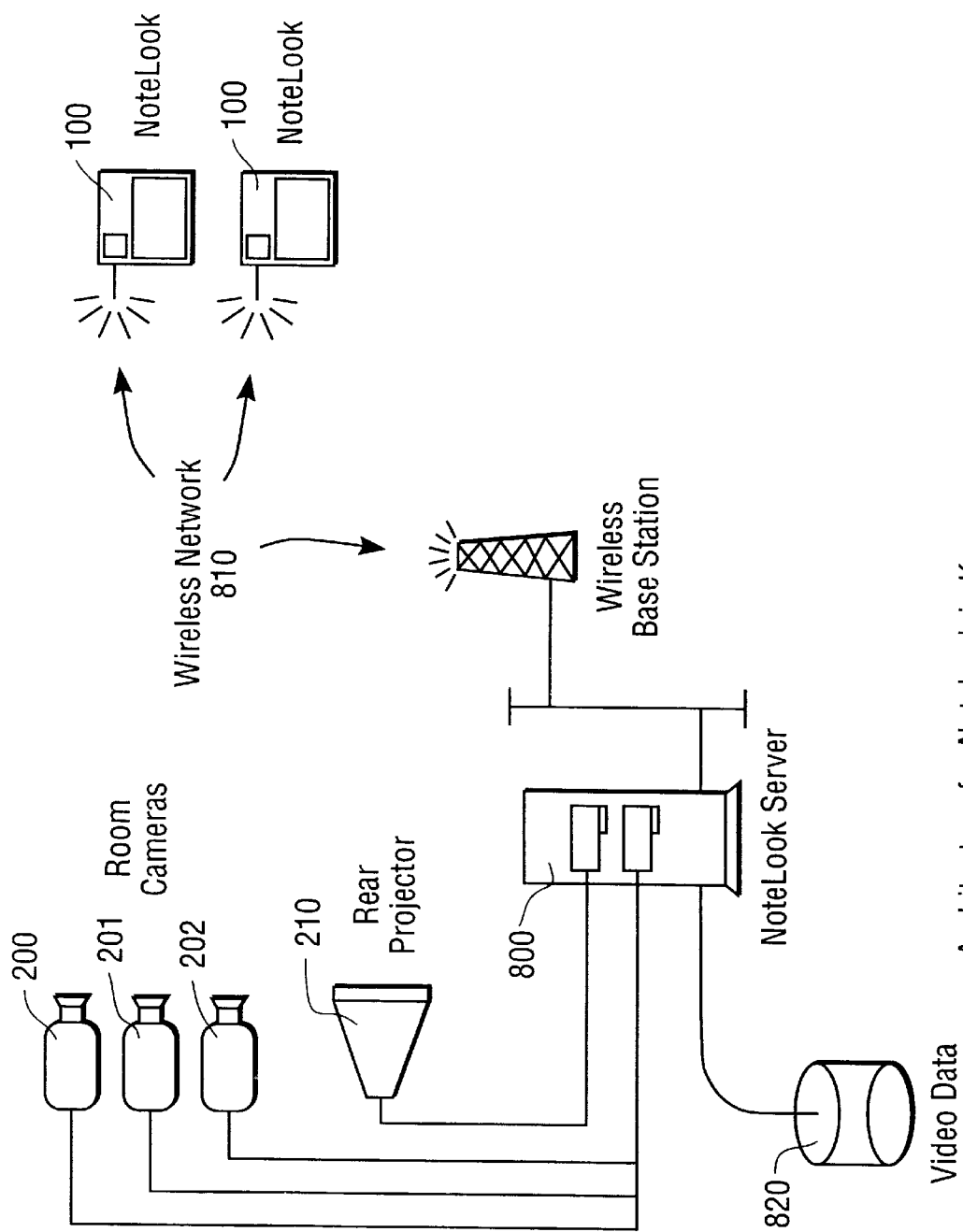
FIG. 8 is a block diagram illustrating an architecture for the NoteLook system.

In the set up at FXPAL, the NoteLook client runs on a pen-based notebook computer: Fujitsu Stylistic 1200 (Pentium 120, 8 inch VGA active matrix display). For wireless network connection, a WaveLan PC Card (10 Mb) is employed. The video is transmitted to the NoteLook clients by the NoteLook server over a wireless network 810 (see FIG. 8.) The NoteLook server runs on Windows 95 or Windows NT (other operating systems are clearly applicable) The server machine is equipped with video capture cards, and accepts composite video. The digital video is captured at 15 or 30 frames a second and stored onto the network for playback. In the current set up at FXPAL Kumo conference room, the main video sources are three room cameras (200, 201, and 202) and a 120-inch rear projector 210. FIG. 5 shows one embodiment of the architecture of NoteLook. Video of presentation material is fed into the rear projector from a workstation 820 in the back room, such as a user-supplied laptop, document camera, VCR, or DVD/CD player, for example The speaker selects the desired rear projector source at the podium. Also, a room camera can be aimed at a whiteboard in the room and show it on the rear projector. Audio in Kumo is captured by six ceiling microphones, combined into a single stream of audio, and stored on the network with the video. Many other combinations of audio, video, or other data may be provided as a media stream to NoteLook clients.

Automatic slide change detection is performed by the NoteLook server (although such detection may be performed on any NoteLook 520, the NoteLook server is a more efficient location for any required processing and subsequent distribution of results). One algorithm to distinguish between video frames is to employ a method of comparing color histograms of successive frames in the video stream to determine when a frame has changed and hence a slide change has occurred Each detected slide change provides a piece of meta data which is sent to the NoteLook client. The client manages indexes created from the meta data and displays marks on the timeline (the dotted line in FIG. 4). For optimizing the wireless bandwidth, frame rate compression is done by dropping frames between slide changes. The video frames and meta data are transmitted to the NoteLook clients using standard TCP/IP methods (again, other methods may be utilized).

NoteLook 2GO and NoteLook 4TV can be implemented by running the NoteLook client and server on the same pen-based notebook computer. For NoteLook 2GO, a portable camera with a USB connection is currently preferred; the USB port provides power to the camera. For NoteLook 4TV, a PC Card for video capture is currently preferred.

Frame rate compression may be utilized to save bandwidth. Automatic change detection (slide change detection, for example) may be utilized and only changes in a media stream are sent to the NoteLook clients. Alternatively, a frame per second rate of material in the media stream may be reduced (i.e., a video shot at 30 fps may be reduced to 1 or 2 fps). This may result in a jittery display at the NoteLook client, however, a perfect video at the notetaking device is not essential to the notetaking process, and, in fact, not needed in situations where the notetaker is present at the video (because the notetaker can hear and see what is taking place).

Auto indexing may also be utilized to automatically determine important video shots that may automatically be captured and made into specific notes (using the same change detection criteria discussed above). Such auto indexed material may also be linked to the timeline (such as the slide change as discussed above).

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention The storage medium can include, but is not limited to, any type of disk including floppy disks, optical discs, DVD, CD-ROMS, microdrive, and magneto-optical disks, ROMs, RAMS, EPROMs, EEPROMS, DRAMs, VRAMS, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to capturing and annotating media streams, producing a timeline of significant note-taking events, linking still frames to points in or segments of a media stream, recognize any slide changes, production and distribution of meta data describing at least a part of a media stream, and communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A notetaking system, comprising:
    a notetaking device that comprises,
        a media input mechanism configured to retrieve at least one live media stream,
        at least one user input mechanism configured to accept user inputs,
        a control device configured to allow said user to at least one of manipulate, connote, and summarize said at least one media stream via said user inputs,
        an ink stroke capture device configured to capture ink strokes on a note page,
        an indexer configured to link each note page to one of a segment of said at least one media stream, and a location in a timetable of events displayed on said notetaking device; and,
    wherein each note page link is graphically represented in a same color as the ink strokes captured on the corresponding note page.

2. The notetaking system according to claim 1, wherein said inkstrokes of each note page are one of plural user selectable colors.

3. A notetaking system for annotating a video presentation, comprising:
    a video input mechanism configured to receive a plurality of video channels depicting a video presentation, each channel communicating a stream of video images from an image source;
    a display configured to allow an operator to view and control the operation of the notetaking system;

a channel selection mechanism for allowing the operatorto select one of said plurality of video channels for viewing on the display;

a capture mechanism for capturing a set of video images from the selected video channel;

an annotation mechanism configured to allow the operator to provide annotations to the set of captured video images; and, a timeline display for displaying a playback timeline of the annotated presentation, including an annotation marker linked to each annotation, and a thumbnail image linked to each set of captured video images.

4. The system of claim 3 wherein the annotations provided by the operator are stored as a separate video channel.

5. The system of claim 3 further comprising:

a persistent storage mechanism for storing the timeline as a notefile including an entry therein for each annotation and each set of captured video images, each of said entries including a pointerto the particularvideo channel that includes the annotation or video image, and a time index into that particular video channel corresponding to the timing of that annotation or set of video images in the playback sequence.

6. The system of claim 5 wherein the storage mechanism stores the notefile, together with any captured images and annotations indexed by the timeline, on a remote server, for subsequent retrieval during playback.

7. The system of claim 5 wherein the storage mechanism stores the notefile, together with any captured images and annotations indexed by the timeline, on the local system, for subsequent retrieval during playback.

8. The system of claim 5 wherein the storage mechanism stores the notefile on the local system, and stores any captured images and annotations indexed by the timeline on a remote server, for subsequent retrieval during playback.

9. The system of claim 3 wherein the channel selection mechanism, capture mechanism, image annotation mechanism, and timeline display are all represented as graphical objects on the display.

10. The system of claim 3 wherein the operator can perform a playback of the annotated presentation from a chosen point in the presentation timeline by selecting a corresponding one of the annotation markers or thumbnail images from the timeline display.

11. The system of claim 3 wherein the capture mechanism can operate automatically by capturing a selection of video images in response to a detected event change in the video stream.

12. The system of claim 3 wherein the capture mechanism can be manually controlled by the operator using a set of buttons on the display.

13. The system of claim 3 wherein the annotations are provided by means of digital ink.

14. The system of claim 3 wherein the annotations are provided by means of text input.

15. The system of claim 3 wherein the annotations are provided by means of verbal or other input.

16. The system of claim 3, wherein the display includes a window within which to view images from a selected video channel, and wherein said channel selection mechanism can select a video channel communicating any of a live camera image, motion video, computer video output, slide image, or other media image, for viewing within the same window.

17. The system of claim 16 wherein the selected video channel communicates images from a video projector.

18. The system of claim 16 wherein the selected video channel communicates images from a computer.

19. The system of claim 18 wherein the selected video channel communicates images from slideshow presentation application running on said computer.

20. The system of claim 16 wherein the selected video channel communicates images from a slide image projector.

21. The system of claim 16 wherein the system includes a first dedicated video channel forcommunicating video images and a second dedicated video channel forcommunicating slide images.

22. The system of claim 16 wherein the system allows the same video channel to be used for communicating either video images or slide images.

23. A method for annotating a video presentation, comprising:

receiving images via a video input mechanism configured to receive a plurality of video channels depicting a video presentation, each channel communicating a stream of video images from an image source;

displaying said images on a display configured to allow an operator to view and control the operation of the notetaking system;

selecting one of said plurality of video channels for viewing on the display;

capturing a set of video images from the selected video channel;

annotating the set of captured video images; and, displaying a playback timeline of the annotated presentation, including an annotation marker linked to each annotation, and a thumbnail image linked to each set of captured video images.

24. The method of claim 23, wherein the display includes a window within which to view images from a selected video channel, and wherein said step of selecting one of said plurality of video channels for viewing on the display includes selecting a video channel communicating any of a live camera image, motion video, computer video output, slide image, or other media image, for viewing within the window.

25. A notetaking system for annotating a video presentation, comprising:

a video input configured to receive a plurality of video channels depicting a video presentation, each channel communicating a stream of video images from an image source;

a display configured to allow an operator to view and control the operation of the notetaking system;

a channel selector device configured to allow the operator to select one of said plurality of video channels for viewing on the display;

an image capture device configured to allow the operator to capture a set of video images from the selected video channel;

an annotation device configured to allow the operator to provide annotations to the set of captured video images; and, a timeline display device for displaying a timeline of the annotated presentation.

* * * * *